March 17, 1942. A. B. WHITE 2,276,636
POWER SYSTEM
Filed June 28, 1940
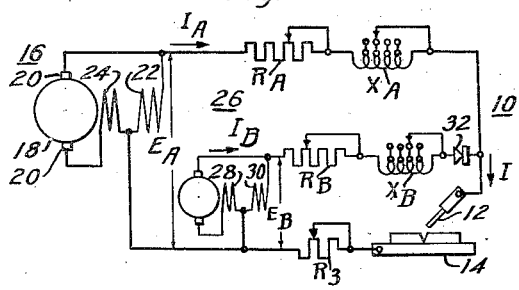
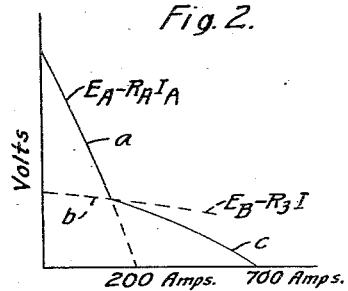
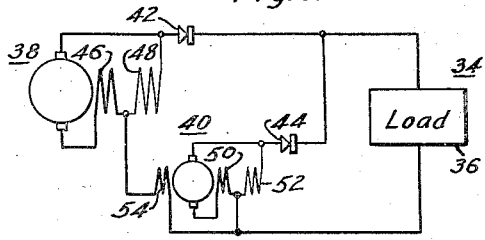
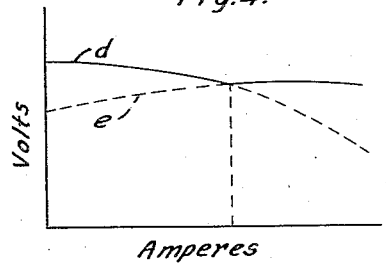
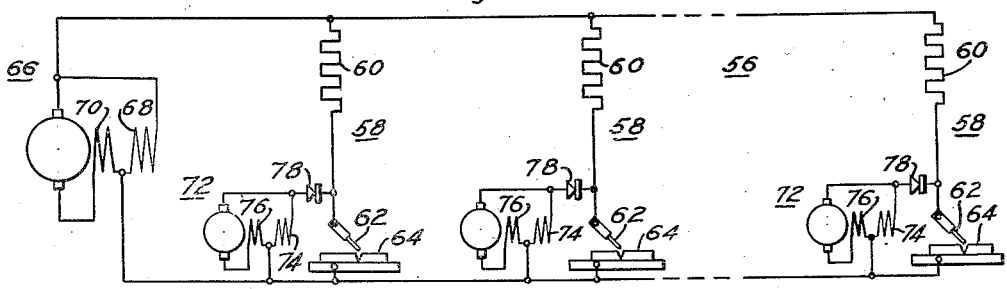
WITNESSES:
H. F. Susser
F. V. Giolma
INVENTOR
Alfred B. White
BY
ATTORNEY Patented Mar. 17, 1942

2,276,636

UNITED STATES PATENT OFFICE 2,276,636

POWER SYSTEM

Alfred B. White, Forest Hills, Pa., assignor to Westinghouse Electric & Manufacturing Company, East Pittsburgh, Pa., a corporation of Pennsylvania Application June 28, 1940, Serial No. 342,970

16 Claims. (Cl. 219—8)

My invention relates generally to power systems, and it has reference in particular to power systems having composite volt-ampere characteristics.

Generally stated, it is an object of my invention to provide for supplying to a load circuit under normal load conditions electrical energy having predetermined current and voltage relations as defined by particular volt-ampere characteristics, and for changing the volt-ampere characteristics under predetermined load conditions.

More specifically, it is an object of my invention to provide for utilizing a plurality of sources of power having different output characteristics to produce a predetermined composite output characteristic.

A further object of my invention is to provide for controlling the output of a source of power in an arc welding system so as to vary the normal volt-ampere curve of the source under predetermined arc conditions.

Another object of my invention is to provide for paralleling a plurality of sources of power having different output characteristics and utilizing unidirectional current means for preventing the flow of a reverse circulating current between the sources.

Still another object of my invention is to provide for supplying additional welding current to an arc welding circuit when the arc voltage reaches a predetermined minimum value.

Yet another object of my invention is to provide a source of power having improved arc welding characteristics by utilizing a main source of power having an auxiliary source of power connected thereto by means of a unidirectional current device for altering the output characteristics of the main source under predetermined conditions.

Often it may be desired to normally supply to a load circuit electrical energy having predetermined current and voltage relations, such as may be defined by a particular volt-ampere curve. When the load voltage reaches a predetermined value, it may then be desirable to supply to the load circuit electrical energy having different current and voltage relations, as defined by a different volt-ampere curve. In arc welding, for example, it has been found that improved welds may be secured by normally supplying welding current under current and voltage conditions defined by a relatively steep volt-ampere curve, and when the length of the arc becomes relatively short, supplying additional welding current to insure against extinction of the arc by globules of molten metal which bridge between the electrode and the work.

According to my invention, a plurality of direct-current power sources having different no-load voltages and different volt-ampere characteristics may be connected for operation in parallel circuit relation to provide a power source having a composite volt-ampere curve. Unidirectional current devices or asymmetric conductors of any suitable type may be connected between the power sources to prevent the flow of a reverse circulating current therebetween. Thus the power source or sources of higher voltage initially supply the current to the load circuit, and as the load increases and the voltage of the source or sources supplying the load current decreases, the sources of lower voltage become effective to assist in supplying load current when the voltage of the load circuit becomes equal to or less than the open circuit voltages of the said sources. Electrical energy may thus be supplied to the load circuit initially in accordance with a drooping volt-ampere curve of a source having a relatively high-open circuit voltage, and when the load voltage is reduced to a predetermined value, a second source having a relatively flat or even a rising volt-ampere curve, but a lower open-circuit voltage, becomes effective to assist in supplying electrical energy to the load circuit.

For a more complete understanding of the nature and scope of my invention, reference may be had to the accompanying drawing, in which:

Figure 1 is a schematic diagram of a welding system embodying the principal features of the invention;

Fig. 2 shows curves illustrating the load characteristics of the system of Fig. 1;

Fig. 3 is a diagrammatic view of a power system embodying a modification of the invention;

Fig. 4 shows curves illustrating the load characteristics of the system of Fig. 3;

Fig. 5 is a diagrammatic view of a multiple circuit welding system embodying the principal features of the invention; and Fig. 6 is a diagrammatic view of a welding system embodying a further modification of the invention.

Referring to Figure 1, the reference numeral 10 may denote generally an arc welding circuit including a fusible electrode 12 for performing a welding operation on work 14. The fusible electrode and the work may be connected to the terminals of a suitable main source of electrical energy such as, for example, the generator 16.

The generator 16 may be of any type well known in the art, having an armature 18 with brushes 20, a shunt field winding 22 and a series field winding 24. The field windings may be so designed as to produce a substantially steep volt-ampere curve such as represented by the curve $a$ of Fig. 2. An open circuit voltage of from about 60 to 100 volts is quite suitable for arc welding purposes.

In order to provide load characteristics which are most beneficial in arc welding, an auxiliary source in the form of a second generator 26 may be connected in parallel circuit relation with the main generator 16 for supplying additional electrical energy to the welding circuit under predetermined conditions. The auxiliary generator 26 may be of any type well known in the art, and may, for example, be provided with a series field winding 28 and a shunt field winding 30, which may be so related as to produce a relatively low open circuit voltage and a relatively flat volt-ampere curve, such as represented by the curve $b$ of Fig. 2. It has been found that an open circuit voltage of the order of 12 volts is quite satisfactory for the purpose.

Suitable means may be provided for preventing the flow of a reverse circulating current between the generators by reason of the voltage difference therebetween. For example, a unidirectional current device 32 may be connected in series with the generator 26 so as to permit the flow of current therethrough only from the generator 26 to the welding circuit.

In order to explain the operation of the welding system, the following designations will be used:

Source A = main generator 16 and its associated circuit.
$E_A$ = voltage of source A.
$I_A$ = current of source A.
$R_A$ = resistance of source A.
$X_A$ = inductance of source A.
Source B = auxiliary generator 26 and its associated circuit.
$E_B$, $I_B$, $R_B$ and $X_B$ = respectively, the voltage, current, resistance and inductance of the source B.
$R_3$ = the resistance common to both sources.
E and I = the arc voltage and arc current, respectively.

When the voltage E of the arc is greater than the voltage of the source B, or of the auxiliary generator 26 and its associated circuit, so that $E > (E_B - R_3 I)$, the auxiliary generator 26 supplies no current to the welding circuit 10. So long as this condition exists, the current and voltage relations of the electrical energy supplied to the welding circuit are determined solely by the volt-ampere curve of the main generator 16, as modified by the resistances $R_A$ and $R_3$, and the inductance $X_A$, and may be represented by the solid portion of the curve $a$ of Fig. 2. In effect, the auxiliary generator 26 is electrically disconnected from the welding circuit, since the unidirectional current device 32 provides a very high resistance to the flow of current therethrough in the reverse direction, and the welding current $I = I_A$.

When the arc voltage E becomes less than the voltage of the source B or of the auxiliary generator 26 and its associated circuit, so that $E < (E_B - R_3 I)$, there is a forward voltage across the unidirectional current device 32, and the auxiliary generator 26 supplies a current $I_B$ to the welding circuit. The current and voltage relations of the electrical energy supplied to the welding circuit are now determined by the load characteristics of both the main generator 16 and the auxiliary generator 26, which may be represented by the portion of the curve $c$ in Fig. 2.

By thus connecting the generators 16 and 26, which have respectively relatively steep and relatively flat volt-ampere curves, and relatively high and relatively low open-circuit voltages, respectively, electrical energy may be initially supplied to the welding circuit 10 having current and voltage relations defined solely by the volt-ampere curve of the main generator 16. When the arc voltage becomes relatively low, and there is a possibility of the arc being short circuited by globules of molten metal bridging between the electrode and the work, the auxiliary generator 26 becomes effective to supply additional welding current for the purpose of maintaining the arc. A source having a composite volt-ampere curve represented by the solid portions of the curves $a$ and $c$ is provided, and the stability of the welding system is thus greatly improved, as is also the quality of the welds produced.

Referring generally to Figs. 3 and 4, the reference numeral 34 may denote generally a power system wherein a load 36 is energized from a plurality of sources such as the generators 38 and 40, which have different open circuit voltages and load characteristics and which are connected in parallel circuit relation. Suitable means may be connected between the generators 38 and 40 to prevent the flow of a reverse circulating current therebetween in either direction such as, for example, the unidirectional current devices 42 and 44.

In this instance, the generator 38 may be provided with a series field winding 46 and a shunt field winding 48, which may be designed to produce a relatively high open circuit voltage and a drooping volt-ampere curve such as indicated by the curve $d$ of Fig. 4.

The generator 40 may also be of any suitable type, and designed for any desired load characteristics. For example, the generator 40 may be provided with a series field winding 50 and a shunt field winding 52, and may, if desired, be overcompounded by means of an additional series field winding 54, which may be connected in series circuit relation with the generator 38, so as to produce a rising volt-ampere curve, such as indicated by the curve $e$ of Fig. 4, although the generator may have a lower open-circuit voltage than the generator 38.

In operation, since the generator 38 has the higher open-circuit voltage it will initially supply current to the load 36. The unidirectional current device 44 effectively blocks the flow of any circulating current through the generator 40 in the reverse direction. As the load increases and the voltage of the generator 38 drops, it approaches the open-circuit voltage of the generator 40. As soon as the voltage applied to the load becomes equal to or less than the open-circuit voltage of the generator 40, the generator 40 commences to supply current to the load. Because of the rising volt-ampere curve $e$ of the generator 40, this generator may be made to supply the entire load current so long as the voltage of the load is greater than the terminal voltage of the generator 38. Different divisions of the load current between the generators, and different resultant load characteristics may readily be obtained by varying the relative amount of compounding of the generators 38 and 40, and their no-load voltages.

Referring to Fig. 5, the reference numeral 56 may denote generally a multiple operator welding system wherein a plurality of welding circuits 58, comprising current-limiting resistors 60, fusible electrodes 62 and work pieces 64 on which welding operations are to be performed, are connected in parallel circuit relation to a suitable main source of welding current, such as the generator 66. The generator 66 may be of any well known type comprising, for example, a compound generator having a shunt field winding 68 and a series field winding 70, which are disposed to give the generator a relatively flat load characteristic. The current limiting resistors 60 produce the desired droop in the voltage of the individual welding circuits when welding.

In order to supply additional welding current to the welding circuits when the voltage of the arc in any of the welding circuits becomes relatively low, suitable means, such as the auxiliary generators 72, may be provided. The generators 72 may be provided with shunt field windings 74 and series field windings 76 which may be so related as to produce relatively low open-circuit voltages and relatively flat volt-ampere curves. The auxiliary generators 72 may be connected in each of the welding circuits in shunt with the arc thereof. To prevent the flow of a reverse circulating current through the armatures of the auxiliary generators when the voltages of the arc are higher than the terminal voltages of the auxiliary generators, unidirectional current devices 78 may be connected in series circuit relation with the auxiliary generators 72.

In operation, the performance of the several welding circuits will be substantially similar to that of the welding system described in connection with Figs. 1 and 2. Under normal welding conditions, the total welding current will be supplied by the main generator 66 and the current limiting resistors 60 will produce the desired drooping load characteristics in the several welding circuits. Should any of the several arcs become too short, so that the voltage of the arc is reduced below a predetermined value such as the open-circuit voltage of its associated auxiliary generator, the auxiliary generator will then be effective to supply additional welding current to the arc. The tendency of the arc to become extinguished by globules of molten weld metal bridging between the electrode and the work is thus prevented, the stability of the welding circuit is increased, and improved performance is obtained.

Referring to Fig. 6, the reference numeral 80 may denote generally a welding system wherein a fusible electrode 82 and work 84 on which a welding operation is to be performed are connected to the terminals of a suitable source of welding current, such as, for example, the generator 86.

The generator 86 may be of any suitable type, such, for example, as the cross-field type as shown, having oppositely positioned field pole members 87 and 88 mounted within a frame 89 and provided with arcuate shoe members 90 and 92, respectively. An armature 94 may be rotatably positioned between the field pole members 87 and 88 and have auxiliary short-circuited brushes 96 and main brushes 98 associated therewith. The field pole members 87 and 88 may be provided with main field windings 100 and 102, respectively.

In order to provide for controlling the load characteristics of the generator 86 so as to vary the normal load characteristics thereof and supply additional welding current when the voltage of the arc is reduced to a predetermined value, suitable means may be provided for controlling the main or cross-field flux of the generator under such conditions. For example, an auxiliary field winding 104 may be positioned on one or both of the shoe members 90 and 92 and so connected to an auxiliary source as to provide for momentarily increasing the cross-field flux under the desired conditions.

In order to control the energization of the auxiliary field winding 104 for facilitating arc welding when the arc voltage is relatively low, suitable means may be provided to introduce a control voltage into the circuit containing the auxiliary field winding 104, which is responsive to the variations of welding current, so that the cross-field flux may be momentarily increased to increase the voltage of the generator when there is a sudden increase in the welding current. For example, a transformer 106 may be provided, having a primary winding 108 connected in series circuit relation with the fusible electrode 82 and the work 84, and a secondary winding 110 connected in series circuit relation with the auxiliary field winding 104.

Suitable means may be provided for controlling the direction of current flow through the auxiliary field winding 104 such as, for example, the unidirectional current device 112, which may be connected in series circuit relation with the auxiliary field winding and the secondary winding 110 of the transformer 106 by means of a reversing switch 114. In this manner, only voltages which energize the auxiliary winding to increase the cross-field flux, may be applied thereto.

In order to permit the energization of the auxiliary field winding 104 only during periods when the arc voltage is below a predetermined value, suitable means may be provided for introducing a voltage into the circuit containing the auxiliary field winding, so as to normally oppose the voltages produced by the secondary winding of the transformer 106. To effect this result, the auxiliary winding 104, the secondary winding 110, and the unidirectional current device 112 may be connected in series circuit relation with a suitable control resistor 116 between the auxiliary brushes 96 of the generator and the lower main brush 98, so that a voltage opposing that applied by the transformer 106 through the unidirectional current device 112 may be introduced into the circuit to prevent energization of the auxiliary field 104 until the arc voltage reaches a predetermined minimum value. It is to be understood that this opposing voltage may be produced in any other suitable manner so long as it has the proper relationship to the arc voltage.

To assist in maintaining the terminal polarity of the generator, and effect additional energization of the auxiliary field winding 104, a suitable source of control potential may be connected in series circuit relation therewith. For example, the secondary winding 118 of a control transformer 120, the primary winding 122 of which may be connected to a suitable source of alternating current may be connected in series circuit relation with the field winding 104 and unidirectional current device 112. If, while the voltage of the arc is below the predetermined value, there are fluctuations in the value of the welding current, voltages will be produced in the secondary winding 110 of the transformer 106 in response to these changes. The primary winding 108 and the secondary winding 110 of the transformer 106 are so related that when there is an increase in the value of the welding current, a voltage is introduced in the secondary winding 110 in such a direction as to increase the main or cross-field flux of the generator. Accordingly, an increase in the value of the welding current when the voltage of the arc is below a predetermined stable value will be effective to produce an increase in the cross-field flux tending to increase the generator voltage and also momentarily increase the welding current.

So long as the voltage of the arc is above a predetermined value, the voltage between the auxiliary brushes 96 and the lower main brush 98 opposes any energization of the auxiliary field winding 104 from the control transformer 120 or from the transformer 106. When the voltage of the arc is reduced below a predetermined value at which the arc remains sufficiently stable, the voltage between the auxiliary brushes 96 and the lower main brush 98 is correspondingly reduced. Under these conditions, the control transformer 120 is effective to energize the auxiliary field winding 104 to increase the main or cross-field flux of the generator and supply additional welding current to prevent the extinction of the arc, and the transformer 106 tends to increase the welding current when there is a sudden increase therein.

From the above description and the accompanying drawing, it will be apparent that I have by my invention provided in a simple and effective manner for producing sources of power having composite load characteristics, and have also provided arc welding systems having characteristics which greatly facilitate welding operations. Sources of electrical energy having greatly different no-load voltages and widely differing load characteristics may readily be connected in parallel circuit relation to produce any desired volt-ampere curve without any undesirable circulating currents between the different sources. They are, in effect disconnected from the load circuit when not supplying current thereto, without the use of complicated and expensive control and switching devices.

Since certain changes may be made in the above description, and different embodiments of the invention may be made without departing from the spirit thereof, it is intended that all the matter contained in the above description and shown in the accompanying drawing shall be considered as illustrative and not in a limiting sense.

I claim as my invention:

1. The combination in an arc welding system for supplying electrical energy to a welding circuit, of main source of electrical energy with a relatively high open-circuit voltage and drooping output characteristics for normally supplying the energy, an auxiliary source of electrical energy having different output characteristics and a predetermined relatively low open-circuit voltage disposed to be connected to the main source to supply energy only when the arc voltage reaches a predetermined minimum value, and circuit means including unidirectional current means connected between the main and auxiliary sources to prevent the flow of a reverse circulating current through the auxiliary source.

2. The combination with an arc welding circuit, of a main source of power having a relatively steep output chracteristic curve with predetermined voltage and current relations, an auxiliary source having a relatively low open circuit voltage and different current and voltage relations, and circuit means including a unidirectional current device connecting the auxiliary source to the main source to render the auxiliary source effective to increase the current supplied to the arc welding circuit relative to the voltage when the voltage of the arc reaches a predetermined minimum value.

3. The combination with an arc welding system including a fusible electrode for maintaining an arc with work upon which a welding operation is to be performed, of a source for normally supplying electrical energy to maintain the arc under current and voltage conditions having predetermined relations, an auxiliary source, and circuit means including a unidirectional current device connecting the sources to render the auxiliary source effective only when the arc voltage becomes less than a predetermined voltage to vary the relation between the current and voltage conditions of the arc.

4. An arc welding system comprising, a welding circuit, a source having a relatively steep volt-ampere curve for normally supplying to the welding circuit electrical energy having predetermined current and voltage relations, an auxiliary source for producing a control voltage less than the normal arc voltage and circuit means connected to the welding circuit effective only when the arc voltage is less than normal to vary the current and voltage relations and increase the current supplied to the welding circuit.

5. A power system comprising, a source having a relatively high open circuit voltage and a relatively steep load characteristic curve for normally supplying electrical energy to a load circuit under varying load conditions, auxiliary means effective to produce a control current for modifying the current and voltage relations of the electrical energy supplied to the load circuit, and circuit means including a unidirectional device connecting the auxiliary means and the source to render the auxiliary means effective when the voltage of the source reaches a predetermined minimum value.

6. A power system comprising, a source having a relatively high open circuit voltage and relatively steep volt-ampere characteristics connected for normally supplying electrical energy to a load circuit, auxiliary circuit means connected to the load circuit for varying the volt-ampere relations of the electrical energy supplied to the load circuit only when the voltage of the load circuit reaches a predetermined minimum value, and a unidirectional current device interposed between the auxiliary circuit means and the source to prevent current flow through the auxiliary circuit means from the said source.

7. The combination with an arc welding system having a main source with a relatively high open circuit voltage and relatively steep volt-ampere characteristics for normally supplying electrical energy to a load circuit, of an auxiliary source having a relatively low open-circuit voltage for supplying additional electrical energy when the arc voltage reaches a predetermined minimum value, and asymmetric current conducting means connected between the auxiliary source and the main source to prevent the circulation of electrical energy between the main and auxiliary sources while the arc voltage is above the predetermined minimum value.

8. A welding system comprising, a plurality of welding circuits normally operable within a predetermined range of welding connected to a main source of electrical energy, an auxiliary source of electrical energy operable within a voltage range below said predetermined range connected in shunt relation with each welding circuit, and circuit means including a unidirectional current device connected to render the auxiliary sources effective to supply additional energy to said circuits only when the welding voltage falls below said predetermined range.

9. A multiple operator welding system comprising, a plurality of arc welding circuits connected in parallel circuit relation to a main source of electrical energy having a relatively high open-circuit voltage and a relatively steep load characteristic, an auxiliary source having a lower open-circuit voltage and a relatively flat load characteristic connected in shunt relation to each welding circuit, and a unidirectional current device connected between the auxiliary source and the main source to prevent a reverse flow of electrical energy through the auxiliary source.

10. The combination with a generator having predetermined load characteristics connected for supplying electrical energy to a load circuit, of an auxiliary source, and circuit means including a unidirectional current device so connected with the load circuit, generator and auxiliary source as to render the auxiliary source effective only when the voltage of the load circuit reaches a predetermined minimum voltage to increase the current output of the generator.

11. A welding system comprising, a generator connected for supplying to a welding circuit electrical energy having predetermined normal current and voltage relations, means for producing a control voltage responsive to variations of conditions in the welding circuit, and circuit means including a unidirectional current device for utilizing the control voltage in one direction only to increase the value of the current relative to the voltage and alter the normal relations of current and voltage of the electrical energy supplied to the welding circuit.

12. The combination with a generator having oppositely positioned field pole members with field windings and an armature associated therewith for supplying electrical energy to an arc welding circuit, of means connected to the load circuit for producing a control voltage in response to variations in conditions in the welding circuit, an auxiliary field winding for the generator connected to said means so as to increase the load current in response to an increase in the load current, and control means including a unidirectional current device and a source of voltage substantially proportional to the arc voltage connected to the auxiliary field winding to effect the energization thereof to prevent any increase in the welding current in response to said control voltage when the arc voltage is less than a predetermined value.

13. The combination with a generator having a plurality of field pole windings and an armature rotatably associated therewith for supplying to a load circuit electrical energy having predetermined normal current and voltage relations, of a circuit including means for producing a control voltage and unidirectional current means connected to one of the field windings for applying a control voltage thereto of a predetermined polarity for increasing the normal output current of the generator, and means for applying to the said circuit a voltage variable in accordance with variations in the voltage of the load circuit for normally opposing the energization of the field winding by the control voltage while the voltage of the load circuit is above a predetermined value.

14. The combination with a generator having a plurality of field windings and an armature rotatably associated therewith for supplying to a welding circuit electrical energy having predetermined normal current and voltage relations, of circuit means including means for producing a voltage responsive to variations in the welding current, means for producing an auxiliary substantially constant voltage, and a unidirectional current device connected to one of the field windings for effecting energization of the said field winding in a sense to increase the normal output of the generator, and means for applying to the said circuit means a control voltage which is a junction of the voltage of the welding circuit to oppose the energization of the said field winding until the voltage of the welding circuit reaches a predetermined minimum value.

15. The combination with a welding system comprising a generator having a plurality of field windings and an armature rotatably associated therewith for supplying to a welding circuit electrical energy having predetermined voltage and current relations, of a control circuit connected to one of the field windings including an auxiliary transformer for producing in the control circuit a substantially constant voltage, an additional transformer having a winding connected in series circuit relation in the welding circuit for introducing into the control circuit a variable voltage responsive to variations in the welding current, a unidirectional current device connected in the control circuit to permit energization of the said field winding only in a sense to increase the output of the generator, and means for applying to the control circuit a blocking voltage substantially proportional to the voltage of the welding circuit to prevent energization of the said field winding from the control circuit except when the voltage of the welding circuit reaches a predetermined minimum value.

16. A generator system comprising, an armature, a plurality of field pole windings, means for producing a control voltage, additional means for producing a second control voltage substantially proportional to the generator voltage and circuit means including a unidirectional device connecting said means to at least one of the field windings in opposed relation so that the first-mentioned control voltage becomes effective to increase the generator output only when the generator voltage reaches a predetermined minimum value.

ALFRED B. WHITE.